(12) United States Patent
Villarruel et al.

(10) Patent No.: US 8,111,992 B2
(45) Date of Patent: *Feb. 7, 2012

(54) AMPLIFIED WAVELENGTH BROADBAND VIDEO DISTRIBUTION ARCHITECTURES

(76) Inventors: Fernando X. Villarruel, Romeoville, IL (US); Steven C. Condra, Plainfield, IL (US); Yihong Chen, Naperville, IL (US); Kevin L. Sweeney, Naperville, IL (US); James W. Sulhoff, Naperville, IL (US)

( * ) Notice: Subject to any disclaimer, the term of this patent is extended or adjusted under 35 U.S.C. 154(b) by 878 days.

This patent is subject to a terminal disclaimer.

(21) Appl. No.: 11/765,078

(22) Filed: Jun. 19, 2007

(65) Prior Publication Data

US 2008/0317467 A1    Dec. 25, 2008

(51) Int. Cl.
*H04J 14/02* (2006.01)
(52) U.S. Cl. .......................................... 398/79; 398/192
(58) Field of Classification Search ............... 398/79, 398/90, 192–198, 201
See application file for complete search history.

(56) References Cited

U.S. PATENT DOCUMENTS

| | | | | |
|---|---|---|---|---|
| 5,953,139 A | * | 9/1999 | Nemecek et al. | 398/79 |
| 7,466,925 B2 | | 12/2008 | Iannelli | |
| 2004/0208622 A1 | * | 10/2004 | Grosz et al. | 398/160 |
| 2006/0140642 A1 | * | 6/2006 | Brolin | 398/183 |
| 2006/0210282 A1 | | 9/2006 | Iannelli | |
| 2007/0014575 A1 | * | 1/2007 | Kramer et al. | 398/71 |
| 2008/0273874 A1 | | 11/2008 | Ramachandran et al. | |
| 2009/0028578 A1 | * | 1/2009 | Sun et al. | 398/193 |

FOREIGN PATENT DOCUMENTS

KR    10-2006-0116317    * 11/2006

* cited by examiner

*Primary Examiner* — Nathan Curs
(74) *Attorney, Agent, or Firm* — Tarolli, Sundheim, Covell & Tummino LLP

(57) ABSTRACT

Provided herein are embodiments of a device, method of use and system for a low-cost analog multi-wavelength video distribution transamplifier for CATV and FTTH networks having a broadband overlay. The transamplifier embodiments described herein allow the use of multiple wavelengths to segment logical service groups in a CATV distribution system and a FTTH system having a broadband overlay.

16 Claims, 6 Drawing Sheets

AMPLIFIED WAVELENGTH BROADBAND VIDEO DISTRIBUTION ARCHITECTURES

CROSS-REFERENCE TO RELATED APPLICATION

This application is related to U.S. application Ser. No. 11/765,152, filed on even date herewith and entitled, "Amplified Wavelength Broadband Video Distribution Architectures Using an External Waveguide,".

TECHNICAL FIELD

The present disclosure relates generally to optical signal transmission and more specifically to amplification of optical signals at a plurality of wavelengths in a video distribution system.

BACKGROUND

In the mid 1990's it became obvious that the world-wide consumer appetite for bandwidth hungry applications would eventually mean a shift not only in the consumer electronics that deliver the "experience," but also in the way that access networks would be deployed and used. At the time, while advances in data delivery over legacy copper networks (DSL for instance) and the implementation of hybrid-coaxial deployments seemed to suffice it was clear that in a short time both of these methods would have severe shortcomings to available end line customer applications. By the early years in this decade, the accelerated availability of high definition television programming, video-on-demand, VoIP, peer to peer gaming, IM, video uploading, etc, made the need for improved access immediate.

In 1998, ITU-T released the standard G.983.1, incorporated herein by reference, that was recommended by the Full Service Access Network (FSAN) group with the intent of working towards a truly broadband fiber access network. This initiative is generally known as the FTTH BPON, ("B" for broadband, and "PON" for passive optical network). One goal of this recommendation was making the delivery of data burdening applications, particularly high end video, as inexpensive as possible. At the physical layer, this means fully leveraging the almost unlimited bandwidth transmission capacity of a fiber waveguide, and for cost reasons sharing one central optical line terminal (OLT) over as many optical network units (ONU) as possible in a point to multipoint distribution configuration. A typical ratio is 16-64 ONU per OLT.

Implicit in the BPON recommendation is the ability to deliver the voice, data and video (e.g., the "triple play") with specific designation to meet these requirements even at the physical layer. The type of information slated for transport in this specification can be broken into three types of services: broadcast (general and directed or narrowband), downstream, and return path services.

In a typical deployment there can be multiple hundreds up to thousands of PON in operation. Many of these PON are serviced by the same backbone transport system. "Downstream" is the specific information only particular to one ONU in a PON. Its delivery is managed by the OLT and dependent on the transport and networking specification use. Examples of downstream service include telephony, video on demand, and high speed data via ATM.

"Broadcast" is information that all ONUs of a particular OLT receive equivalently and exactly. Broadcast includes, for instance, nationally syndicated TV channels such as NBC, CBS, and ABC, or locally syndicated channels such as, for example, city council TV. "General broadcast" occurs when the same information is provided to all ONUs of many OLTs in a deployment (e.g., NBC, ABC, CBS, etc.) A "directed broadcast" occurs when all ONU's of a considerable subset of OLTs from of a deployment receive the same information (e.g., city council TV). Broadcast information and narrowcast information can be any form of data, voice or video. For example, in one instance broadcast information can be data such as QAM to a modem. Likewise, narrowcast information can be data such as QAM to a single modem or a subset of modems.

"Return path" is the upstream information that allows a closed loop information exchange system.

Generally, in a typical PON architecture there are four optical bands of operation, the 1270 nm to the 1350 nm band for the upstream, the coarse wave-division multiplexing (CWDM) band above the water peak up to 1480 nm for future upgrades, the 1480 nm to 1500 nm for the downstream, and the 1550-1560 nm range for downstream broadcast distribution. The hardware implemented is also particular with function and expectation. At a central office (CO) resides an OLT, which is an ATM based transceiver to transmit at 1490 nm and receive a 1310 nm signal generated by the ONU module. Also, at the CO is the placement of a 1550 nm transmission and the optical amplification necessary to transmit a broadband RF spectrum signal. The combination of the downstream signals and the drop of the upstream signal at the CO happen through a passive wide band filter. The input/output of this passive multiplexer is incident on one optical fiber and per the ITU specification can have a maximum logical reach of about 20 km for the BPON, with some distance variation for GPON and EPON configurations. Nearing the end of this PON distance there is a high count 1×N optical splitter, after which each fiber terminates at an ONU, typically a residence or business of some sort.

A typical ONU comprises an optical triplexer, which takes the input from the 1490 and 1550 nm upstream signals and separates them for independent reception, and takes the upstream 1310 signal and adds it to the PON fiber. Also comprising the ONU are the opto-to-electrical conversion properties of the receiver diode, amplification, and AGC circuit sets that prepare the signal for demodulation at the TV or set top box video receivers. The purpose of the video overlay (over the optical network (e.g., PON)) is to transmit a portion of the radio frequency spectrum (55 MHz to 1 GHz) to each ONU, a proven technology for high quality transmission of analog amplitude modulation and QAM. QAM modulation is Quadrature Amplitude Modulation, a symbol based modulation where amplitude and phase components exist according to baseband digital subsets. The QAM symbol capacity can differ, from 64 to 1024 symbol schemes, but most typically 256 symbol modulation is used. Currently deployable transmission capacity for the video overlay is quite large, up to 6.6 Gbps, which can support up to 1256 HD video channels, or 6594 SD video channels.

This RF modulation scheme and the leveraging of its transmission capacity have been perfected over the last two decades in HFC applications. HFC architectures have a fiber trunk that terminates at a node followed by a coaxial plant that distributes signal to the end uses. However, it can be advantageous to replace the coaxial distribution with a PON.

In RF transmission links, both the electronics and optics disrupt the input signal via various noise sources. The challenge for these types of links is that these impairments must all be managed or corrected to a certain extent for efficient interpretation by the end line user. The main noise sources to contend in these systems are: Relative Intensity Noise (RIN) from transmitter laser and laser to modulator interaction, and from optical amplifiers; intermodulation noise from transmitter, fiber, and fiber scattering; diode and electronic characteristics in the optical receiver module; and fiber non-linear interaction between multiple wavelengths. The relative intensity noise penalties degrade the RF signal to noise (CNR) parameter per channel over the whole operating band, the intermodulation noise creates harmonic beating effects (CSO from second orders, CTB from third orders) spread statistically throughout the operating band, and scattering phenomena appear due to the high launch powers necessary for cost effective delivery of signal, (SBS (stimulated Brillouin scattering) and SRS (stimulated Raman scattering) for multiple wavelengths interaction). All of these if unchecked reduce the necessary quality of service.

As a point of reference, in HFC, for optical fiber terminating at a node the specifications per channel are typically carrier to noise ratio CNR>52 dBc, composite second order (CSO)<−65 dBc, and composite triple beat (CTB)<−65 dBc, while for in FTTH for fiber terminating at an ONU the specifications per channel are typically CNR>46 dBc, CSO<−53 dBc, CTB<−53 dBc. For QAM transmission at an HFC node the specification desired is typically <1E-9 symbol BER (bit error rate), while for a FTTH ONU only a <1E-6 symbol BER is required.

With respect to the noise impediments, HFC systems are intermodulation limited. Thus all the technology development, network design, and cost reduction has gone mostly towards creating hardware that can mitigate intermodulation effectively. From the perspective of optical links, this means delivering to the coaxial plant very low levels of intermodulation distortions (e.g. −65 dBc), to be degraded rapidly through RF amplifiers to end delivery at customer site with some margin on typical standard (e.g. ~53 dBc.) This limit has historically bound the evolution of optical networks in HFC. Specifically, this means that without due design provisions both at the board and systems level one would expect the CSO to go out of spec long before the CNR would.

FTTH systems, on the other hand, are more directly limited by factors of overall broadband noise sources which come from the interplay of composite laser modulation limits and in particular the shot noise coming from the optical to electrical conversion in the ONU receivers. These two points describe the maximum CNR per channel for FTTH systems. Practically, it is the case that for both technical reasons and cost scalability one wants to design FTTH architectures such that the broadband 1550 nm portions hits the receiver at the minimum value possible. For this case, FTTH systems are often referred to as shot noise limited. This limit however enables the use of multiple optical amplifiers in cascade, another distinction to HFC, where operating at optical input powers into the node higher than 0 dBm the RIN contribution from optical amplifiers can quickly dominate the CNR parameter.

One adverse, but necessary, point of comparison to HFC is that the optical link budget for PON recommendations is at or above 25 dB. It is known that while the physical limit of uncorrected sources is 7 dBm into fiber >25 km, which ultimately means that unlike for HFC links, that for FTTH the end of the optics link will be incident at a receiver at powers much lower than zero dBm, down to −8 dBm. This then leaves the receiver shot noise as the only dominant term to define the CNR for RF channels in the system, even to the point where other broadband noise terms, such as RIN from transmitters and amps are far secondary limiting factors. This benefit will become quickly apparent in the discussion of allowable optical amplifier cascades in FTTH.

Therefore, what is needed is an architecture that overcomes many of the challenges found in fiber, hybrid-fiber and fiber-deep architectures with broadband overlays, many of which are described above. In particular, what is needed are device, methods and systems to provide high optical power delivery systems to streamline the implementation and cost of FTTH and fiber-deep architectures while technically maintaining a high quality of service.

OVERVIEW

Provided herein are embodiments of a device, method of use and system for a low-cost analog multi-wavelength video distribution transamplifier for hybrid-fiber and fiber-deep CATV architectures, and FTTH networks having a broadband overlay. The transamplifier embodiments described herein allow the use of multiple wavelengths to segment logical service groups in a CATV distribution system and a FTTH system having a broadband overlay.

In one aspect, a transamplifier is provided. The transamplifier is comprised of one or more optical transmitters. Each optical transmitter receives an input signal and transmits a transmitter output optical signal having a respective transmitted power level. The transamplifier is further comprised of an optical multiplexer having a plurality of inputs and at least one output. Each of the one or more optical transmitters are operatively connected with a respective one of the plurality of inputs of the multiplexer and the output is configured to transmit a combined optical signal comprised of each of the transmitter output optical signals having respective transmitted power levels. The combined optical signal has a combined power level. Further comprising the transamplifier is an optical amplifier having an input and an output. The input of the optical amplifier receives the combined optical signal, amplifies it and transmits an amplified combined optical signal to the output of the optical amplifier. Further comprising the transamplifier is an optical demultiplexer. The optical demultiplexer has an input and a plurality of outputs. The input of the optical demultiplexer is configured to receive at least a portion of the amplified combined optical signal, split the amplified combined optical signal into a plurality of discrete output optical signals of varying power and wavelength sections, and transmit each discrete output optical signal to one of the plurality of outputs. In one embodiment, the optical amplifier can be a multiple-doped fiber amplifier such as a cladding pumped amplifier. In this instance, the combined power level of the combined optical signal is greater than a threshold power level ($P_{min}$) at the input of the optical amplifier such that the optical amplifier is operational and results in an acceptable quality of a communications channel for each of the discrete output optical signals. In another embodiment, the optical amplifier can be an single-doped fiber amplifier such as an EDFA amplifier. In other embodiments, the optical amplifier can be a solid state amplifier. A level of input power to the optical amplifier is chosen based on operational characteristics of the optical amplifier chosen and the desired amplification.

In another aspect, a method of tuning a transamplifier is provided. The method comprises providing a plurality of input signals to a transamplifier. Desired characteristics for each of a plurality of output discrete optical signals from the transamplifier are determined. Each of said the plurality of output discrete optical signals from the transamplifier are analyzed. If the analyzed signals do not meet or do not substantially meet the desired characteristics, then the transamplifier is adjusted to obtain the desired characteristics for each of the plurality of output discrete optical signals. Adjusting the transamplifier to obtained the desired characteristics for each of the plurality of output discrete optical signals can include, for example, adjusting one or more of an amplitude of one or more of the plurality of input signals to the transamplifier; adjusting the frequency of one or more of the plurality of input signals to the transamplifier; adjusting the input power associated with one or more of the plurality of input signals to the transamplifier; adjusting output power of one or more of the optical transmitters; adjusting power input to the optical amplifier of the transamplifier; adjusting the wavelength of an amplification signal provided by the optical amplifier of the transamplifier; adjusting electronic pre-distortion compensation of one or more of the plurality of input signals to the transamplifier, adjusting electronic pre-distortion compensation of one or more electrical signals within the transamplifier, adjusting optical distortion compensation of one or more optical signals within the transamplifier, and by selection of a laser having certain characteristics for the optical amplifier of the transamplifier.

Yet another aspect according to the present invention is a system for transporting voice, data and video signals over a fiber optic network. The system comprises an optical line termination (OLT) operatively coupled to the fiber-optic network; an optical network unit (ONU) operatively coupled to the fiber-optic network; a transamplifier operatively coupled to the fiber-optic network such that the discrete output signals of the transamplifier are combined with voice and data signals from the OLT using WDM and transported to the ONUs through the fiber-optic network.

Additional advantages will be set forth in part in the description which follows or may be learned by practice. The advantages will be realized and attained by means of the elements and combinations particularly pointed out in the appended claims. It is to be understood that both the foregoing general description and the following detailed description are examples and explanatory only and are not restrictive, as claimed.

BRIEF DESCRIPTION OF THE DRAWINGS

The accompanying drawings, not drawn to scale, which are incorporated in and constitute a part of this specification, illustrate embodiments and together with the description, serve to explain the principles of the methods and systems.

DESCRIPTION OF EXAMPLE EMBODIMENTS

Figure 1A:
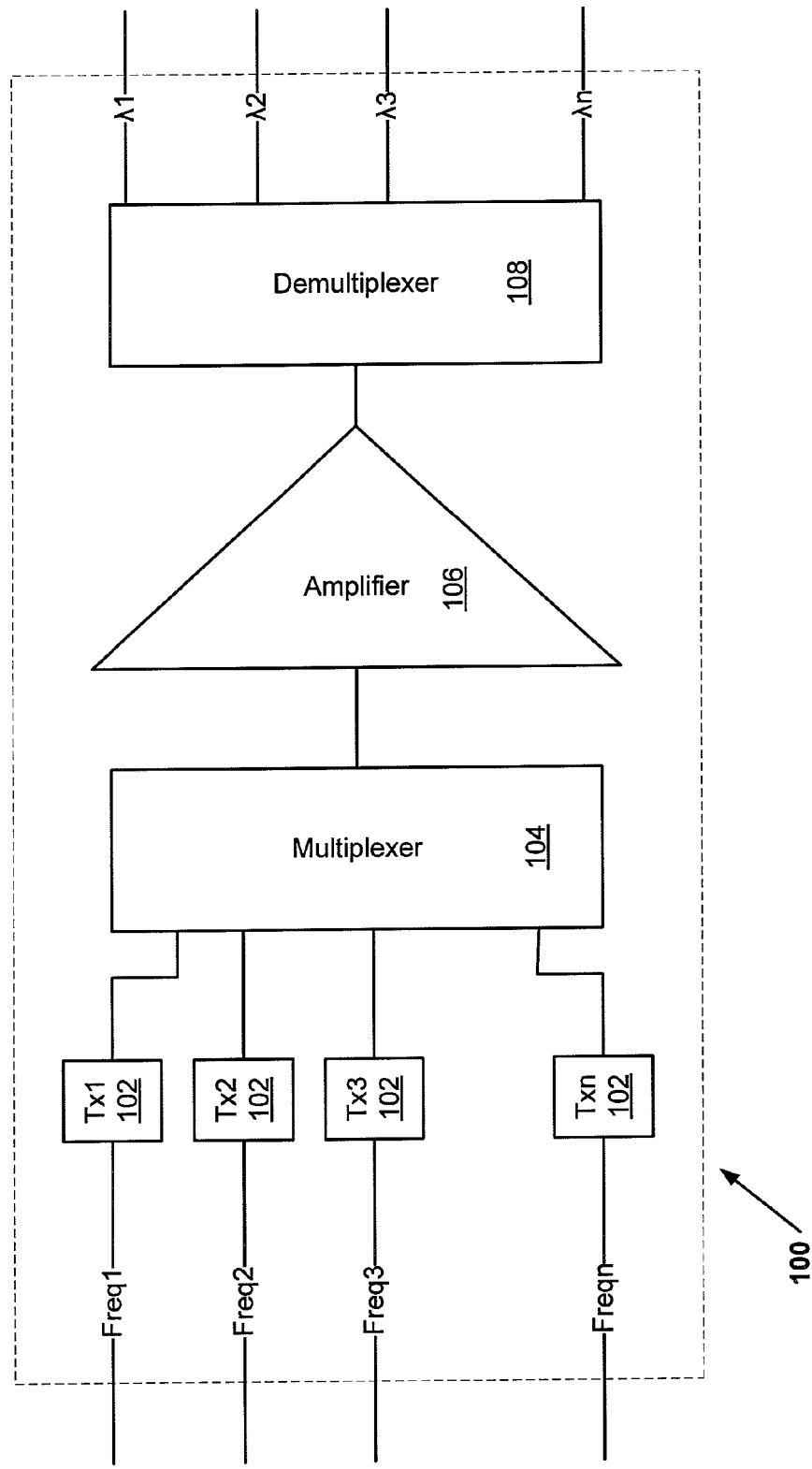
FIGS. 1A-1D are illustrations of a transamplifier in various embodiments according to the present invention.

Before the present methods and systems are disclosed and described, it is to be understood that the methods and systems are not limited to specific synthetic methods, specific components, or to particular compositions, as such may, of course, vary. It is also to be understood that the terminology used herein is for the purpose of describing particular embodiments only and is not intended to be limiting.

As used in the specification and the appended claims, the singular forms "a", "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

The present methods and systems may be understood more readily by reference to the following detailed description of preferred embodiments and the Examples included therein and to the Figures and their previous and following description.

I. HFC

HFC is a telecommunications industry term for a network which incorporates both optical fiber along with coaxial cable to create a broadband network. The fiber optic network extends from the cable operators' master headend, sometimes to regional headends, and out to a neighborhood's hubsite, and finally to a fiber optic node which serves anywhere from 25 to 2000 homes. A master headend or central office will usually have satellite dishes for reception of distant video signals as well as IP aggregation routers. Some master headends also house telephony equipment for providing telecommunications services to the community. A regional or area headend will receive the video signal from the master headend and add to it the Public, Educational and/or Governmental (PEG) channels as required by local franchising authorities or insert targeted advertising that would appeal to a local area.

II. FTTP/FTTH/FTTC

Fiber to the premises (FTTP) is a form of fiber-optic communication delivery in which an optical fiber is run directly onto the customers' premises. This contrasts with other fiber-optic communication delivery strategies such as fiber to the node (FTTN), fiber to the curb (FTTC), or HFC, all of which depend upon more traditional methods such as copper wires or coaxial cable for "last mile" delivery. FTTN, FTTC and HFC are also sometimes referred to as fiber deep architectures, meaning that fiber is run to a node close to the home or premises and coaxial cable or other forms of copper conductors are used to transition the "last mile" to the home or premises. These architectures are all contemplated within the scope of embodiments according to the present invention.

Fiber to the premises can be further categorized according to where the optical fiber ends: FTTH (fiber to the home) is a form of fiber optic communication delivery in which the optical signal reaches the end user's living or office space and FTTB (fiber to the building, also called fiber to the basement) is a form of fiber optic communication delivery in which the optical signal reaches the premises but stops short of the end user's living or office space.

In FTTP, an optical signal is distributed from the central office over an optical distribution network (ODN). At the endpoints of this network, devices called optical network units (ONUs) convert the optical signal into an electrical signal. The signal usually travels electrically between the ONU and the end-users' devices.

Optical distribution networks have several competing technologies. The simplest optical distribution network can be called direct fiber. In this architecture, each fiber leaving the central office goes to exactly one customer. More commonly each fiber leaving the central office is actually shared by many customers. It is not until such a fiber gets relatively close to the customers that it is split into individual customer-specific fibers. There are two competing optical distribution network architectures which achieve this split: active optical networks (AONs) and passive optical networks (PONs).

Active optical networks rely on electrically powered equipment to distribute the signal, such as a switch, router, or multiplexer. Each signal leaving the central office is directed only to the customer for which it is intended. Incoming signals from the customers avoid colliding at the intersection because the powered equipment there provides buffering.

Passive optical networks do not use electrically powered components to split the signal. Instead, the signal is distributed using beam splitters. Each splitter typically splits a single fiber into 16, 32, or 64 fibers, depending on the manufacturer, and several splitters can be aggregated in a single cabinet. A beam splitter cannot provide any switching or buffering capabilities; the resulting connection is called a point-to-multipoint link. For such a connection, the optical network terminations on the customer's end must perform some special functions which would not otherwise be required. For example, due to the absence of switching capabilities, each signal leaving the central office must be broadcast to all users served by that splitter (including to those for whom the signal is not intended). It is therefore up to the optical network termination to filter out any signals intended for other customers.

In addition, since beam splitters cannot perform buffering, each individual optical network termination must be coordinated in a multiplexing scheme to prevent signals leaving the customer from colliding at the intersection. Two types of multiplexing are possible for achieving this: wavelength-division multiplexing (WDM) and time-division multiplexing. With wavelength-division multiplexing, each customer transmits their signal using a unique wavelength. With time-division multiplexing, the customers "take turns" transmitting information.

In comparison with active optical networks, passive optical networks have significant advantages and disadvantages. They avoid the complexities involved in keeping electronic equipment operating outdoors. They also allow for analog broadcasts, which can simplify the delivery of analog television. However, because each signal must be pushed out to everyone served by the splitter (rather than to just a single switching device), the central office must be equipped with powerful transmission equipment. In addition, because each customer's optical network termination must transmit all the way to the central office (rather than to just the nearest switching device), customers can't be as far from the central office as is possible with active optical networks.

A passive optical network (PON) is a point-to-multipoint, fiber to the premises network architecture in which un-powered optical splitters are used to enable a single optical fiber to serve multiple premises, typically 32. A PON can comprise an Optical Line Terminal (OLT) at the service provider's central office and a number of Optical Network Units (ONUs) near end users.

Upstream signals are combined using a multiple access protocol, invariably time division multiple access (TDMA). The OLTs "range" the ONUs in order to provide time slot assignments for upstream communication.

A PON takes advantage of wavelength division multiplexing (WDM), using one wavelength for downstream traffic and another for upstream traffic on a single fiber. As with bit rate, the standards describe several optical budgets, but the industry has converged on 28 dB of loss budget. This corresponds to about 20 km with a 32-way split.

A PON can comprise an OLT, one or more user nodes (ONUs), and the fibers and splitters between them, called the optical distribution network (ODN). The OLT provides the interface between the PON and the backbone network. The ONU terminates the PON and presents the native service interfaces to the user. These services can comprise voice (plain old telephone service (POTS) or voice over IP-VoIP), data (typically Ethernet or V.35), video, and/or telemetry (TTL, ECL, RS530, etc.). A PON is a converged network, in that all of these services are typically converted and encapsulated in a single packet type for transmission over the PON fiber.

A broadband overlay capacity in PON networks can be thought of in two ways. The most obvious is that it provides a physical layer that allows delivery of broadcast video, where most successful operators have leveraged the cost basis of this layer to deliver general video, where up to thousands of ONUs receive the same video content for a very affordable cost/home. The second capacity is that the BPON provides a pipe that can not only serve in general broadcast video distribution, but can also relieve the burden of other downstream video or video like applications that burden the OLT with high data rates and stringent throughput specifications, VOD and switch digital video, for instance. This is generally referred to as directed broadcasting or narrowcast, where the video overlay serving size is not segmented by the thousands, but by the hundreds, even down to 120 ONUs per broadcast signal. In order to facilitate such an overlay system comprising broadcast and narrowcast, embodiments of a transamplifier according to the present invention are provided, which can simultaneously segment general broadcast and directed broadcast into different wavelengths and amplified sections.

III. TRANSAMPLIFLER

FIG. 1A is an illustration of a transamplifier 100 in an embodiment according to the present invention. As shown in FIG. 1, the transamplifier 100 is comprised of one or more optical transmitters (Tx1-Txn) 102. Each optical transmitter 102 receives an input signal (freq1-freqn), modulates each respective signal, and transmits a transmitter output optical signal to a multiplexer 104. In one aspect, the transmitters 102 can be, for example, FTTH transmitters with SBS suppression technology as available from Scientific-Atlanta, Inc., a Cisco Company, of Lawrenceville, Ga., though other transmitters are contemplated within the scope of this invention.

Figure 1B:
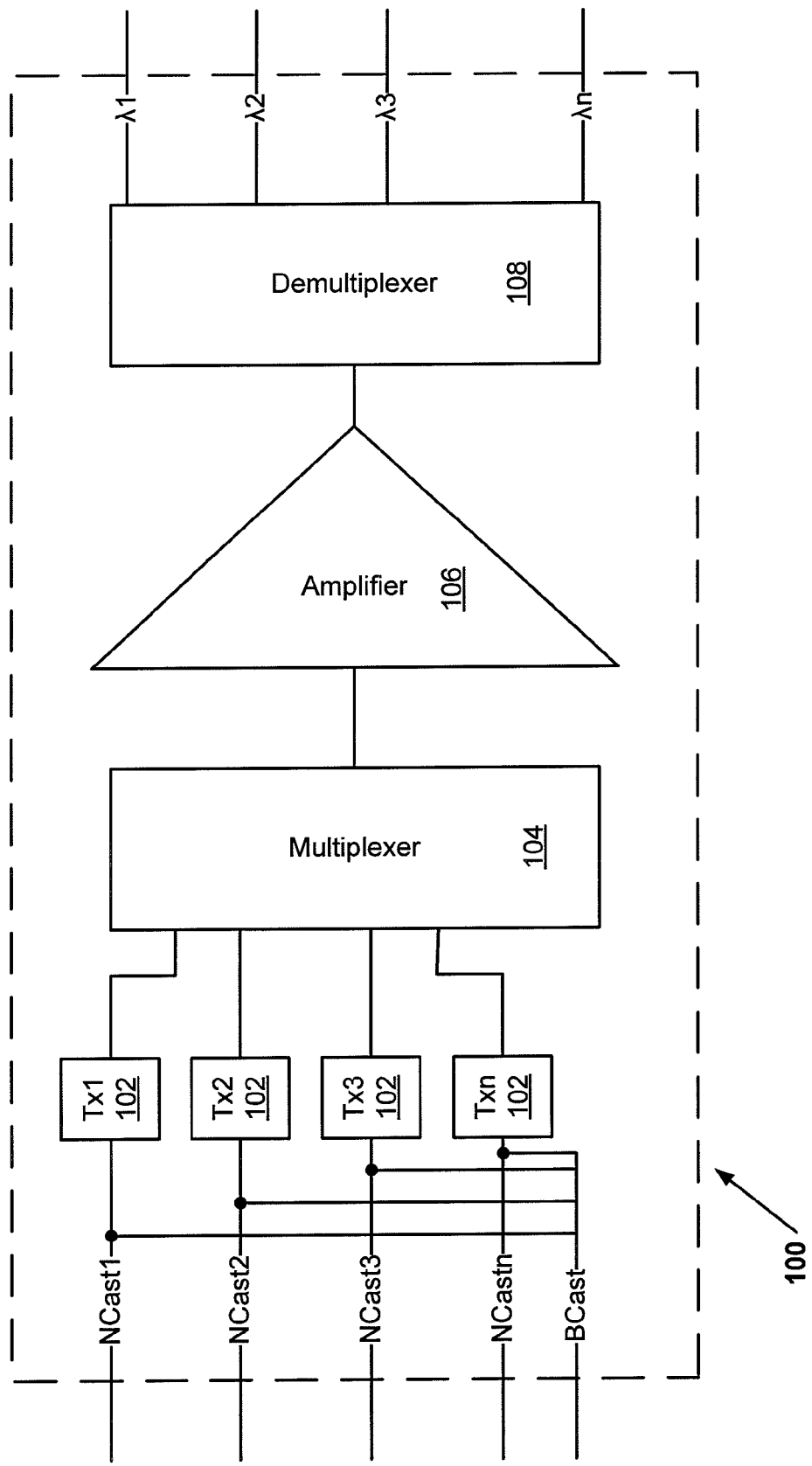
Figure 1C:
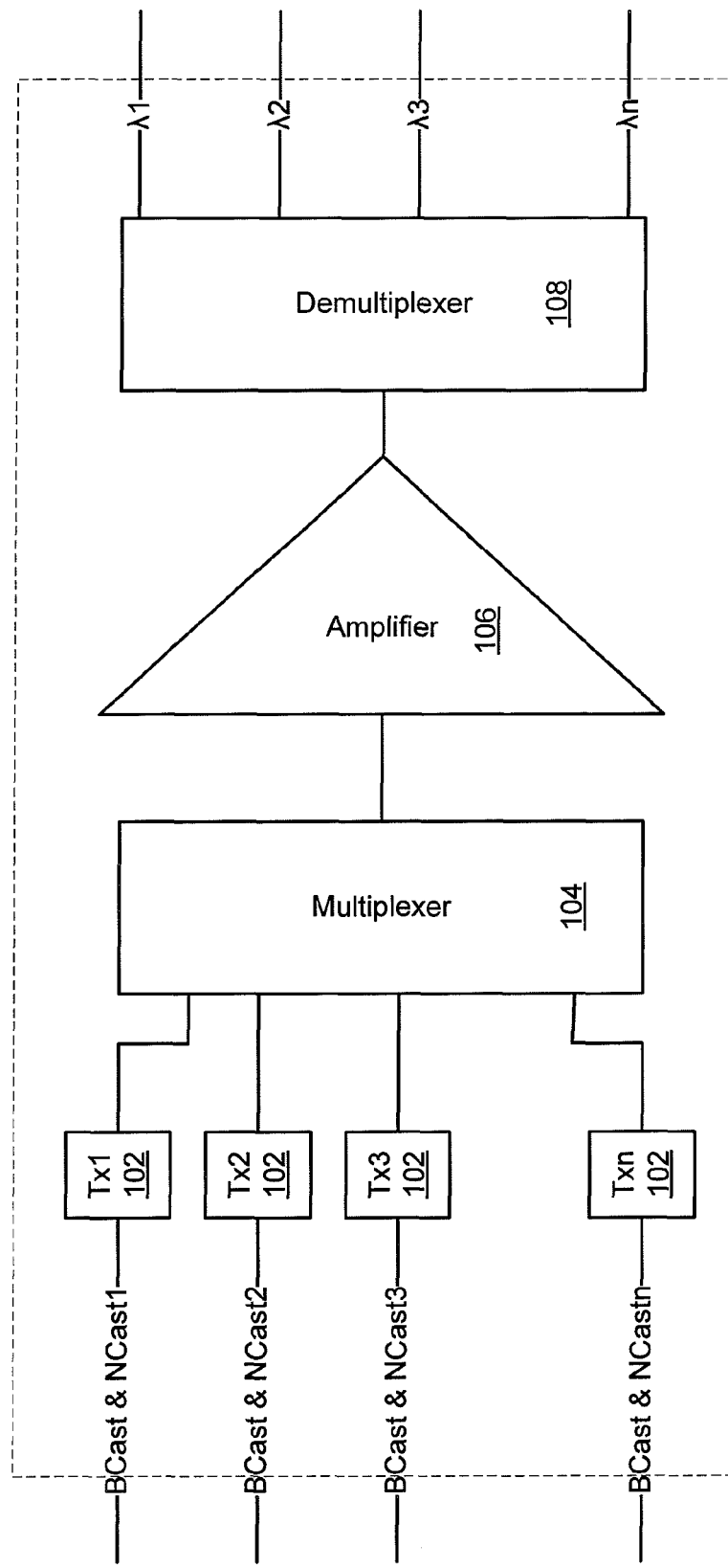

The input signals (freq1-freqn) can be comprised of broadcast information, directed information, narrowcast information, or any combination of broadcast, directed, and narrowcast information. Referring to FIGS. 1A-1C, it can be seen that there are various and numerous combinations of inputs to the transamplifier. For instance, as shown in the embodiment of FIG. 1B, the input signals to the transamplifier are comprised of n narrowcast signals (NCast1-NCastn) and one broadcast signal (BCast) that is connected with each of the narrowcast signals. Similarly, in FIG. 1C, each input signal is comprised of a discrete narrow cast signal (NCast1-NCastn) in combination with a broadcast signal (BCast). It is to be appreciated that these are just a few input signal arrangements, and that numerous others are contemplated under the scope of the invention.

The output of each optical transmitter 102 is operatively connected with an input of the multiplexer 104, as are known in the art to one of ordinary skill. The transmitter output optical signal of each optical transmitter 102, which is provided to the multiplexer 104, has a respective transmitted power level. For example, in an instance where four transmitter output signals are provided to the multiplexer 104, the transmitted power levels of the respective transmitter output signals can each be 10 dBm.

The multiplexer 104 is an optical multiplexer, as are known in the art, and has a plurality of inputs and at least one output. The outputs of each of the one or more optical transmitters 102 are operatively connected with a respective one of the plurality of inputs of the multiplexer 104. The output of the multiplexer 104 is configured to transmit a combined optical signal comprised of the transmitter output optical signals having respective transmitted power levels. The combined optical signal has a combined power level.

The combined optical signal, having a combined power level, is provided to the input of an optical amplifier 106. The optical amplifier can be a single-doped, fiber-doped amplifier such as an EDFA, a multiple-doped, fiber-doped amplifier such as a cladding pumped amplifier, or a solid state amplifier. The optical amplifier 106 has an output, and further characterized as having a Relative Intensity Noise (RIN) level. Though RIN is a characteristic of an optical amplifier, it is also inherent in the transmitter laser and laser to modulator interaction, thus resulting in RIN produced by the transamplifier. Further RIN can be produced by the system or network to which the transamplifier is connected, and such RIN can be caused by intermodulation noise from transmitter, fiber, and fiber scattering; diode and electronic characteristics in the optical receiver module; and fiber non-linear interaction between multiple wavelengths. RIN degrades the RF signal to noise (CNR) parameter per channel over the whole operating band, the intermodulation noise creates harmonic beating effects (CSO from second orders, CTB from third orders) spread statistically throughout the operating band, and scattering phenomena appear due to the high launch powers necessary for cost effective delivery of signal. All of these if unchecked reduce the necessary quality of service. A characteristic of an optical amplifier is that the power level of an input signal to the amplifier affects the amount of RIN produced by the optical amplifier. For instance, if the power level of the input signal is above a threshold level ($P_{min}$), in some instances the RIN produced by the optical amplifier is severely reduced or negligible. Further, for a cladding pumped amplifier, $P_{min}$ is required to be at a minimum level for proper operation of the cladding pumped amplifier. Typical $P_{min}$ levels for a cladding pumped amplifier can be about 15 dBm and about 5 dBm for an EDFA amplifier.

The input of the optical amplifier 106 is operatively connected with the output of the optical multiplexer 104. The optical amplifier 106 receives the combined optical signal from the multiplexer 104, amplifies it, and transmits the amplified combined optical signal to its output. In one aspect, the optical amplifier can be a multiple-doped, fiber-doped amplifier such as a cladding pumped amplifier. One such cladding pumped amplifier is erbium (Er)-ytterbium (Yb) amplifier described in U.S. Pat. No. 5,225,925 issued to Grubb et al. on Jul. 6, 1993 and hereby incorporated by reference in its entirety, though other cladding pumped amplifiers are contemplated within the scope of this invention. In another aspect, the optical amplifier can be single-doped, doped-fiber amplifier such as an Erbium Doped Fiber Amplifier (EDFA), as are known in the art to one of ordinary skill. The EDFA can boost an optical signal. By way of example, an EDFA can comprise several meters of glass fiber doped with erbium ions. When the erbium ions are excited to a high energy state, the doped fiber changes from a passive medium to an active amplifying medium. In other aspects, the optical amplifier can be a solid-state amplifier or other amplifiers configured to amplify an optical signal.

Figure 1D:
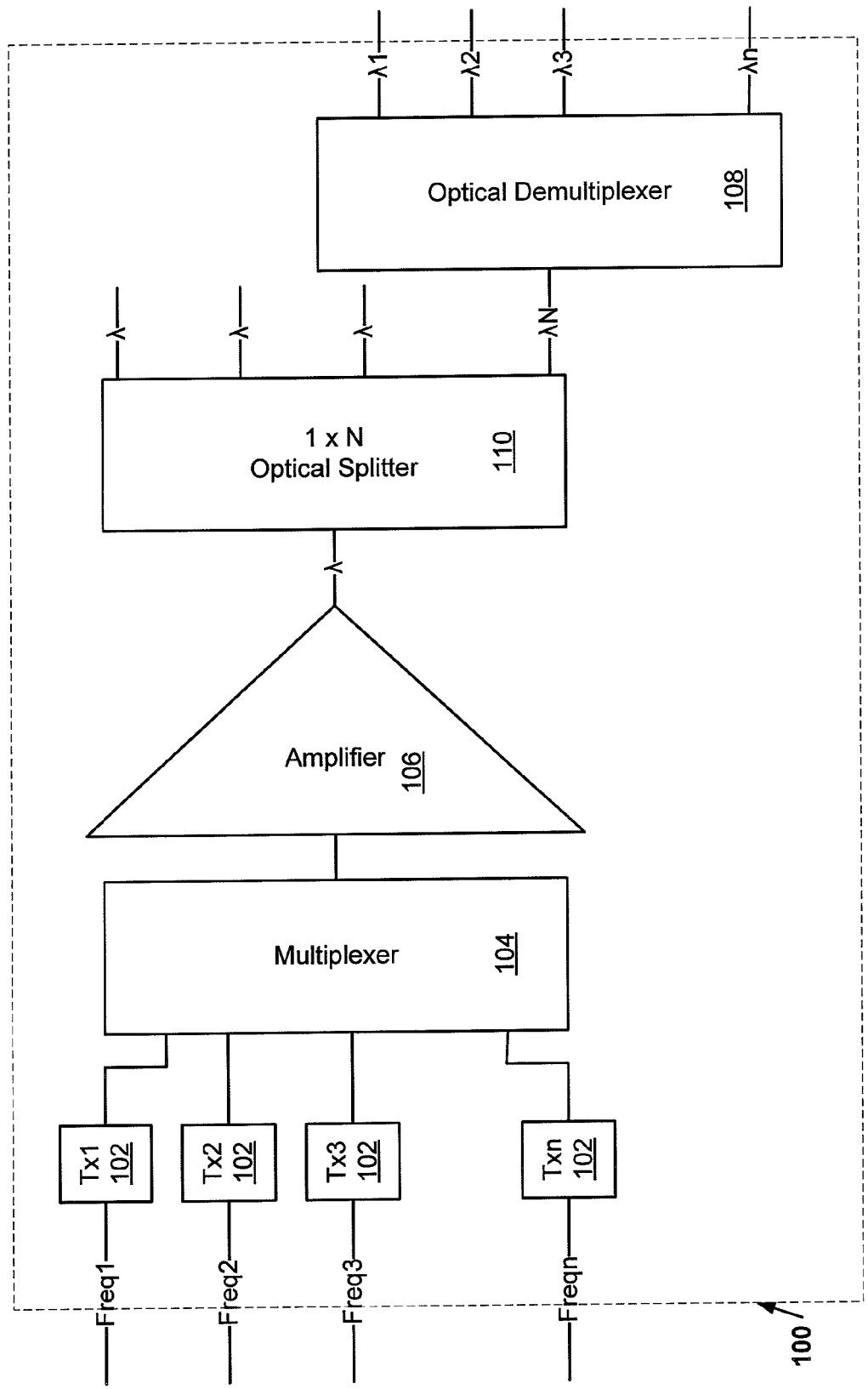

Further comprising the transamplifier 100 is an optical demultiplexer 108, as are known in the art, and having an input and a plurality of outputs. In one instance, the input of the demultiplexer 108 is operatively connected to the output of the optical amplifier 106. The optical demultiplexer 108 is configured to receive the amplified combined optical signal from the optical amplifier 106, split the amplified combined optical signal into a plurality of discrete output optical signals of varying power and wavelength selections, and transmit each discrete output optical signal to one or more of the plurality of outputs of the demultiplexer 108. The wavelength selections can be comprised of a signal having a single wavelength, or a signal comprised of a plurality of wavelengths. The signal can be further spilt using, for example, a 1×N splitter, as are known in the art. In another aspect, and as shown in FIG. 1D, the output of the optical amplifier 106 can be provided to an optical splitter 110, and then provided to one or more optical demultiplexer 108.

In operation, the combining of the transmitter output optical signals results in a combined optical signal having a combined power level. If this combined power level is greater than the threshold power level ($P_{min}$), then, if the optical amplifier is a cladding pumped amplifier, the amplifier is operational. This results in a transamplifier having an acceptable quality of a communications channel for each of the discrete output optical signals. The transamplifier further allows a system operator to not only broadcast but also narrowcast to each individual group according to its differentiated needs. In one aspect, acceptable quality of a communications channel for each of the discrete output optical signals is determined by a signal to noise ratio (SNR). In another aspect, the acceptable quality of a communications channel for each of the discrete output optical signals is determined by a carrier to noise ratio (CNR). CNR from the perspective of a receiver operatively connected to the network comprised of a transamplifier, can be determined by the equation $$CNR = \left(\frac{1}{2 \cdot B}\right) \frac{m^2 \cdot I^2}{2e \cdot I + n^2 + RIN \cdot I^2},$$

where m is optical modulation per channel, I is an average received photocurrent, B is noise bandwidth per channel, n is thermal noise introduced by an optical receiver referred to the photocurrent, e is electron charge and RIN is the relative intensity noise of the system, including all parts of the transamplifier and its link interaction.

Figure 2:
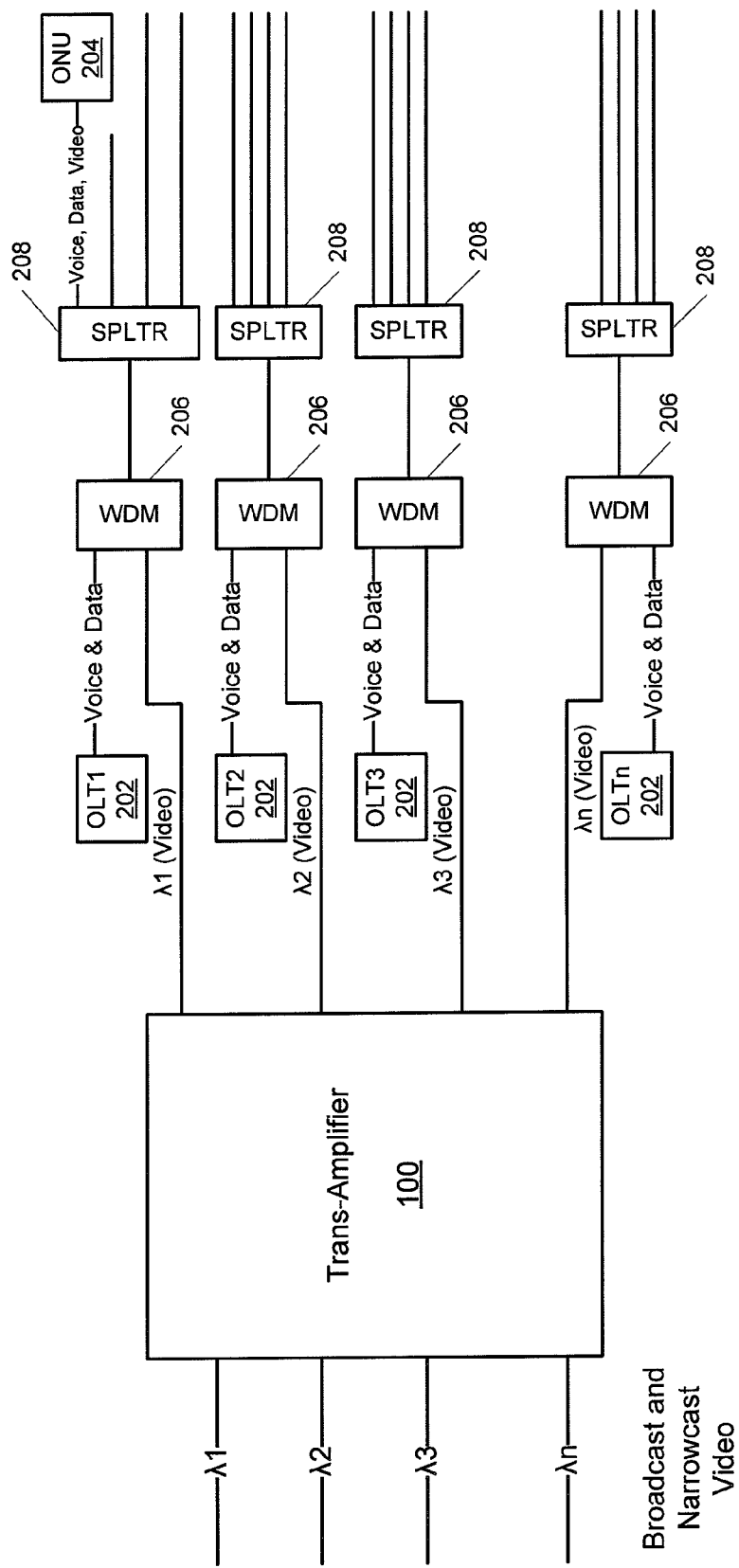
FIG. 2 is an illustration of a system for transporting video, voice and data over a fiber optic network in an embodiment according to the present invention.

FIG. 2 is an illustration of a system for transporting video, voice and data over a fiber optic network in an embodiment according to the present invention. In FIG. 2, the system is comprised of one or more optical line terminations (OLTs) 202 operatively coupled to a fiber-optic network. An OLT 202 is responsible for transmitting voice and data downstream to one or more ONUs 204, and allocating upstream bandwidth to the ONUs 204. Each ONU 204 is operatively coupled to the fiber-optic network. Further comprising the system is a transamplifier 100, as previously described herein. Information signals, such as, for example, video, whether broadcast, narrowcast, directed, combinations thereof, or otherwise are provided to the fiber optic network from the transamplifier 100 through one or more wavelength-division multiplexers (WDMs) 206.

The WDM 206 allows for the transmission of two or more signals by sending the signals at different wavelengths through the same fiber. The system can further comprise a splitter 208 to service a further plurality of end users. Each fiber leaving the splitter 208 can be coupled to an optical network unit, such as ONU 204. In one aspect, the fiber optic network is a passive optical network (PON), which are known in the art and further described herein.

IV. EXAMPLE METHODS

Figure 3:
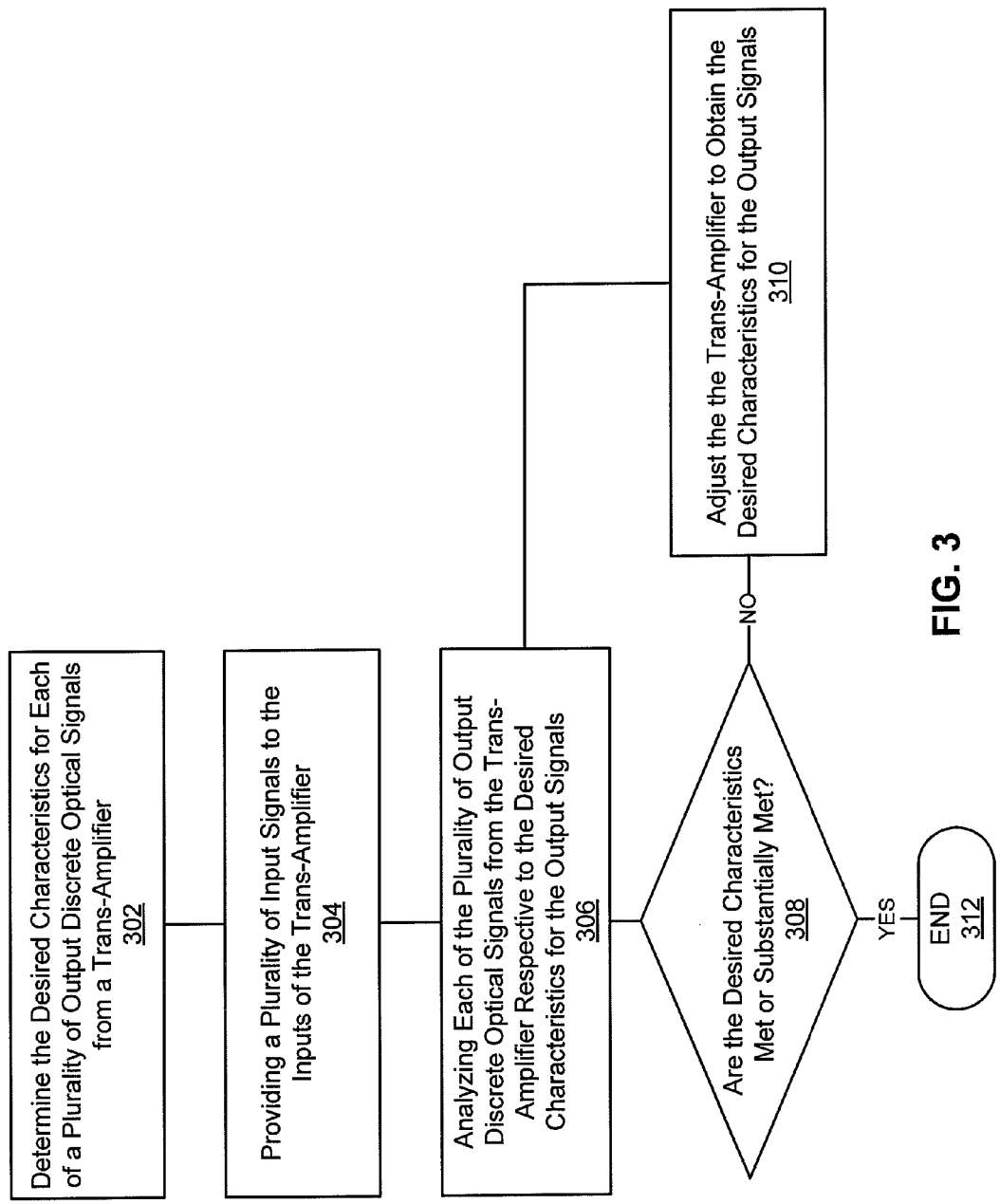
FIG. 3 is a flowchart illustrating an embodiment of a method tuning a transamplifier according to the present invention.

In one embodiment, illustrated in FIG. 3, methods are provided for tuning a transamplifier according to the present invention. The method comprises the steps of determining the desired characteristics for each of a plurality of output discrete optical signals from a transamplifier 302; providing a plurality of input signals to the inputs of the transamplifier 304; and analyzing each of the plurality of output discrete optical signals from the transamplifier respective to the desired characteristics for the output signals 306. At step 308, it is determined whether the desired characteristics (as determined in step 302) have been met, or substantially met. If not, then the process goes to step 310, where the transamplifier is adjusted to obtain the desired characteristics for the output signals. If, however, at step 308 it is determined that the desired characteristics (as determined in step 302) have been met, or substantially met, then the process goes to step 312, where it ends.

Determining the desired characteristics for each of a plurality of output discrete optical signals from a transamplifier 302 includes determining the desired power level for one or more of the plurality of output discrete optical signals; the wavelengths for one or more of the plurality of output discrete optical signals; the CNR for one or more of the plurality of output discrete optical signals; and carrier distortion ratios (e.g., composite second order (CSO) and composite triple beat (CTB)) for one or more of the plurality of output discrete optical signals, bit error rate (BER) and the like.

Adjusting the transamplifier to obtain the desired characteristics for the output signals (step 310) includes adjusting one or more of an amplitude of one or more of the plurality of input signals to the transamplifier; adjusting the wavelength of one or more of the plurality of input signals; adjusting input power associated with one or more of the plurality of input signals; adjusting output power of one or more of the optical transmitters; adjusting power input to the optical amplifier; adjusting the wavelength of an amplification signal provided by the optical amplifier; adjusting the electronic pre-distortion of one or more of the plurality of input signals to the transamplifier; by selection or replacement of the components of the transamplifier including a laser having certain characteristics for the optical amplifier.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as examples only, with a true scope and spirit being indicated by the following claims.

What is claimed is:

1. A method of tuning a transamplifier comprising:
providing a plurality of analog input signals to a transamplifier, the transamplifier comprised of:
one or more optical transmitters, wherein each optical transmitter receives one of the analog input signals and transmits a transmitter analog output optical signal having a respective transmitted power level;
an optical multiplexer having a plurality of inputs and at least one output, wherein each of the one or more optical transmitters are operatively connected with a respective one of the plurality of inputs and the output is configured to transmit a combined analog optical signal comprised of each of the transmitter analog output optical signals having respective transmitted power levels and the combined analog optical signal having a combined power level;
a cladding-pumped optical amplifier having an input and an output, wherein the input receives the combined analog optical signal, amplifies it and transmits an amplified combined analog optical signal to the output of the cladding-pumped optical amplifier; and
an optical demultiplexer having an input and a plurality of outputs, wherein the input is configured to receive at least a portion of the amplified combined analog optical signal, split the amplified combined analog optical signal into a plurality of discrete analog output optical signals of varying power and wavelength selections, and transmit each discrete analog output optical signal to one of the plurality of outputs;
determining desired characteristics for each of the plurality of output discrete analog optical signals;
analyzing each of the plurality of output discrete analog optical signals; and
adjusting the transamplifier to obtain the desired characteristics for each of the plurality of output discrete analog optical signals.

2. The method of claim 1, wherein adjusting the transamplifier to obtain the desired characteristics for each of the plurality of output discrete analog optical signals comprises adjusting one or more of an amplitude of one or more of the plurality of analog input signals, the wavelength of one or more of the plurality of analog input signals, input power associated with one or more of the plurality of analog input signals, output power of one or more of the optical transmitters, power input to the cladding-pumped optical amplifier, wavelength of an amplification signal provided by the cladding-pumped optical amplifier, electronic pre-distortion compensation of one or more of the plurality of analog input signals to the transamplifier, electronic pre-distortion compensation of one or more electrical signals within the transamplifier, optical pre-distortion compensation of one or more analog optical signals within the transamplifier, and by selection of a laser having certain characteristics for the cladding-pumped optical amplifier.

3. The method of claim 1, wherein determining desired characteristics for each of the plurality of output discrete analog optical signals comprises determining desired characteristics for carrier to noise ratio (CNR) and one or more carrier to distortion ratios.

4. The method of claim 1, wherein the combined power level of the combined analog optical signal is greater than of approximately 15 dBm at the input of the cladding-pumped optical amplifier such that RIN characteristics associated with the cladding-pumped optical amplifier are substantially mitigated.

5. The method of claim 1, wherein the transamplifier further comprises an optical splitter having one input and N outputs, wherein the optical splitter receives the amplified combined analog optical signal from the cladding-pumped optical amplifier and splits it into N analog signals such that the optical demultiplexer receives the portion of the amplified combined analog optical signal from the optical splitter.

6. The method of claim 1, wherein a quality of a communications channel for each of the discrete analog output optical signals of the transamplifier is determined by a signal to noise ratio (SNR).

7. The method of claim 1, wherein a quality of a communications channel for each of the discrete analog output optical signals of the transamplifier is determined by a carrier to noise ratio (CNR).

8. The method of claim 1, wherein each analog input signal is a video signal.

9. The method of claim 1, wherein each analog input signal is broadcast information, narrowband information, or combined broadcast and narrowband information.

10. A system for transporting voice, data and video signals over a fiber optic network, comprising:
an optical line termination (OLT) operatively coupled to the fiber-optic network;
an optical network unit (ONU) operatively coupled to the fiber-optic network; and
a transamplifier operatively coupled to the fiber-optic network, wherein the transamplifier is comprised of:
one or more optical transmitters, wherein each optical transmitter receives an analog input signal and transmits a transmitter output analog optical signal having a respective transmitted power level;
an optical multiplexer having a plurality of inputs and at least one output, wherein each of the one or more optical transmitters are operatively connected with a respective one of the plurality of inputs and the output is configured to transmit a combined analog optical signal comprised of each of the transmitter output analog optical signals having respective transmitted power levels and the combined analog optical signal having a combined power level;
an optical amplifier having an input and an output, wherein the input receives the combined analog optical signal, amplifies it and transmits an amplified combined analog optical signal to the output of the optical amplifier, the combined power level of the combined analog optical signal being greater than a threshold power level ($P_{min}$) at the input of the optical amplifier such that RIN characteristics associated with the optical amplifier are substantially mitigated; and
an optical demultiplexer having an input and a plurality of outputs, wherein the input is configured to receive at least a portion of the amplified combined analog optical signal, split the amplified combined analog optical signal into a plurality of discrete analog output optical signals of varying power and wavelength selections, and transmit each discrete analog output optical signal to one of the plurality of outputs; and
one or more wavelength-division multiplexers (WDMs), wherein the discrete analog output optical signals of the transamplifier are combined with analog voice and data signals from the OLT using WDMs and transported to the ONU through the fiber-optic network.

11. The system of claim 10, wherein the fiber optic network is a passive optical network (PON).

12. The system of claim 10, wherein each input analog signal is a video signal.

13. The system of claim 10, wherein each input analog signal is broadcast information, narrowband information, or combined broadcast and narrowband information.

14. The system of claim 10, wherein the combined power level of the combined analog optical signal is greater than approximately 15 dBm at the input of the optical amplifier.

15. A transamplifier apparatus operative coupled to a fiber-optic network, the transamplifier comprising:
one or more optical transmitters in the transamplifier apparatus, wherein each optical transmitter receives an analog input signal and transmits a transmitter analog output optical signal having a respective transmitted power level;
an optical multiplexer in the transamplifier apparatus having a plurality of inputs and at least one output, wherein each of the one or more optical transmitters are operatively connected with a respective one of the plurality of inputs and the output is configured to transmit a combined analog optical signal comprised of each of the transmitter analog output optical signals having respective transmitted power levels and the combined analog optical signal having a combined power level;
an optical amplifier in the transamplifier apparatus having an input and an output, wherein the input receives the combined analog optical signal, amplifies it and provides an amplified combined analog optical signal to the output of the optical amplifier, the combined power level of the combined analog optical signal being greater than a threshold power level ($P_{min}$) at the input of the optical amplifier such that RIN characteristics associated with the optical amplifier are substantially mitigated; and
an optical demultiplexer in the transamplifier apparatus having an input and a plurality of outputs, wherein the input is configured to receive at least a portion of the amplified combined analog optical signal, split the amplified combined analog optical signal into a plurality of discrete analog output optical signals of varying power and wavelength selections, and transmit each discrete analog output optical signal to one of the plurality of outputs for transmission via an optical fiber transmission medium to one or more wavelength-division multiplexers (WDMs), wherein the discrete analog output optical signals are combined with analog voice and data signals from an optical line termination (OLT) using the WDMs and transported to an optical network unit (ONU) through the fiber-optic network.

16. A transamplifier apparatus comprising:
one or more optical transmitters in the transamplifier apparatus, wherein each optical transmitter receives one of a respective one or more analog input signals and transmits a transmitter analog output optical signal having a respective transmitted power level;

an optical multiplexer in the transamplifier apparatus having a plurality of inputs and at least one output, wherein each of the one or more optical transmitters are operatively connected with a respective one of the plurality of inputs and the output is configured to transmit a combined analog optical signal comprised of each of the transmitter analog output optical signals having respective transmitted power levels and the combined analog optical signal having a combined power level;

a cladding-pumped optical amplifier in the transamplifier apparatus having an input and an output, wherein the input receives the combined analog optical signal, amplifies it and provides an amplified combined analog optical signal to the output of the cladding-pumped optical amplifier; and an optical demultiplexer in the transamplifier apparatus having an input and a plurality of outputs, wherein the input is configured to receive at least a portion of the amplified combined analog optical signal, split the amplified combined analog optical signal into a plurality of discrete analog output optical signals of varying power and wavelength selections, and transmit each discrete analog output optical signal to one of the plurality of outputs for transmission via an optical fiber transmission medium;

wherein at least one of the one or more transmitters, the optical multiplexer, the cladding-pumped optical amplifier, and the optical demultiplexer are adjustable to obtain desired characteristics for each of the plurality of discrete analog output optical signals in response to a determination of the desired characteristics and an analysis of each of the plurality discrete analog output optical signals.

* * * * *